United States Patent [19]

Andoh et al.

[11] 4,432,586

[45] Feb. 21, 1984

[54] ANTI-SKID BRAKE CONTROL SYSTEM FOR MOTOR VEHICLES

[75] Inventors: Masamoto Andoh; Harumi Ohhori; Takashi Kiriyama, all of Toyota, Japan

[73] Assignee: Aisin Seiki Kabushiki Kaisha

[21] Appl. No.: 408,872

[22] Filed: Aug. 17, 1982

Related U.S. Application Data

[63] Continuation of Ser. No. 188,117, Sep. 17, 1980, abandoned.

[30] Foreign Application Priority Data

Sep. 26, 1979 [JP] Japan .................................. 54-123658

[51] Int. Cl.³ .............................................. B60T 8/02
[52] U.S. Cl. ..................................... 303/115; 92/159; 303/24 R; 303/92; 303/119
[58] Field of Search ................ 303/115, 119, 113, 114, 303/116, 112, 61–63, 68–69, 24 A, 24 R, 118, 24 C, 24 B, 92, 24 F, 117; 188/181 A, 181 R, 264 B; 403/359, 82; 92/153, 158, 159, 86.5

[56] References Cited

U.S. PATENT DOCUMENTS

| | | | |
|---|---|---|---|
| 2,349,253 | 5/1944 | Edmund | 92/159 X |
| 3,920,279 | 11/1975 | Inada et al. | 303/115 |
| 4,066,301 | 1/1978 | Harries | 303/115 |
| 4,131,326 | 12/1978 | Takayana et al. | 303/115 |
| 4,168,867 | 9/1979 | Ando et al. | 303/115 |
| 4,212,500 | 7/1980 | Ando et al. | 303/24 A X |

*Primary Examiner*—Douglas C. Butler
*Attorney, Agent, or Firm*—Oblon, Fisher, Spivak, McClelland & Maier

[57] ABSTRACT

An anti-skid brake control system for motor vehicles including a housing, a power piston movable therein and dividing the interior of the housing into two chambers one on each side of the power piston, a conduit member connecting one of the chambers to an engine intake manifold, and a solenoid valve for controlling a pressure differential between the chambers in response to an input signal. The housing has an internally projecting guiding member on which is free to slidingly reciprocate a blind bore of the power piston having a plurality of axial grooves in its internal surface for storage of lubricant grease and communication of the blind bore with the interior of the housing.

8 Claims, 3 Drawing Figures

ANTI-SKID BRAKE CONTROL SYSTEM FOR MOTOR VEHICLES

This is a continuation of application Ser. No. 188,117 filed Sept. 17, 1980, now abandoned.

BACKGROUND OF THE INVENTION

Field of the Invention

This invention relates to an anti-skid brake control system for motor vehicles and more particularly to an anti-skid actuator including a power diaphragm movable piston in a housing to effect movement of a pressure modulating piston in response to a pressure differential thereacross.

Description of the Prior Art

In the known type of the actuators, the power piston ordinarily has a sliding fit on a guiding member stationary in the housing, so that the piston may flutteringly reciprocate on the guide member in order to effect movement of the pressure modulating piston or plunger for anti-skid purposes. The power piston has a blind bore in the central portion and the guide member projects from the internal face of the housing for a sliding fit engagement with the bore of the power piston.

This prior art arrangement, however, tends to render the actuators inoperative due to loss of the lubricant grease from out of the blind bore over a period of time caused by the fluttering reciprocation of the piston. The deficiency further tends to result in an insufficient lubrication of the piston on the guiding member and hence to an abrasion of the guide member and blind bore assembly. The resultant powdered metal caused by the insufficient lubrication is considered as a great disadvantage and short-coming in practice, in that it would tend to offer other deficiencies in the closed and non-accessible interior of the housing. The arrangement has further proven to offer another deficiency in practice, in that a cavity defined between the end face of the guiding member and the bottom of the blind bore varies in volume synchronously with the reciprocation of the power piston thus causing alternately vacuum and compressed pressures in the cavity and thence a resistance against the reciprocation of the power piston on the guiding member.

SUMMARY OF THE INVENTION

Accordingly, among the objects of the present invention is the provision of a mechanism for guiding the piston on the guide member for the actuators, which is substantially devoid of the foregoing and related disadvantages and drawbacks inherent in the prior art arrangement, in which a suitable number of axial grooves formed in the internal surface of the blind bore provides better storage cavities for the lubricant grease and allowance of fluid communication between the cavity and the interior of the housing, thus avoiding the alternated vacuum or compressed air pressure and hence the resistance against the piston reciprocation.

BRIEF DESCRIPTION OF THE DRAWINGS

Various other objects, feature and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
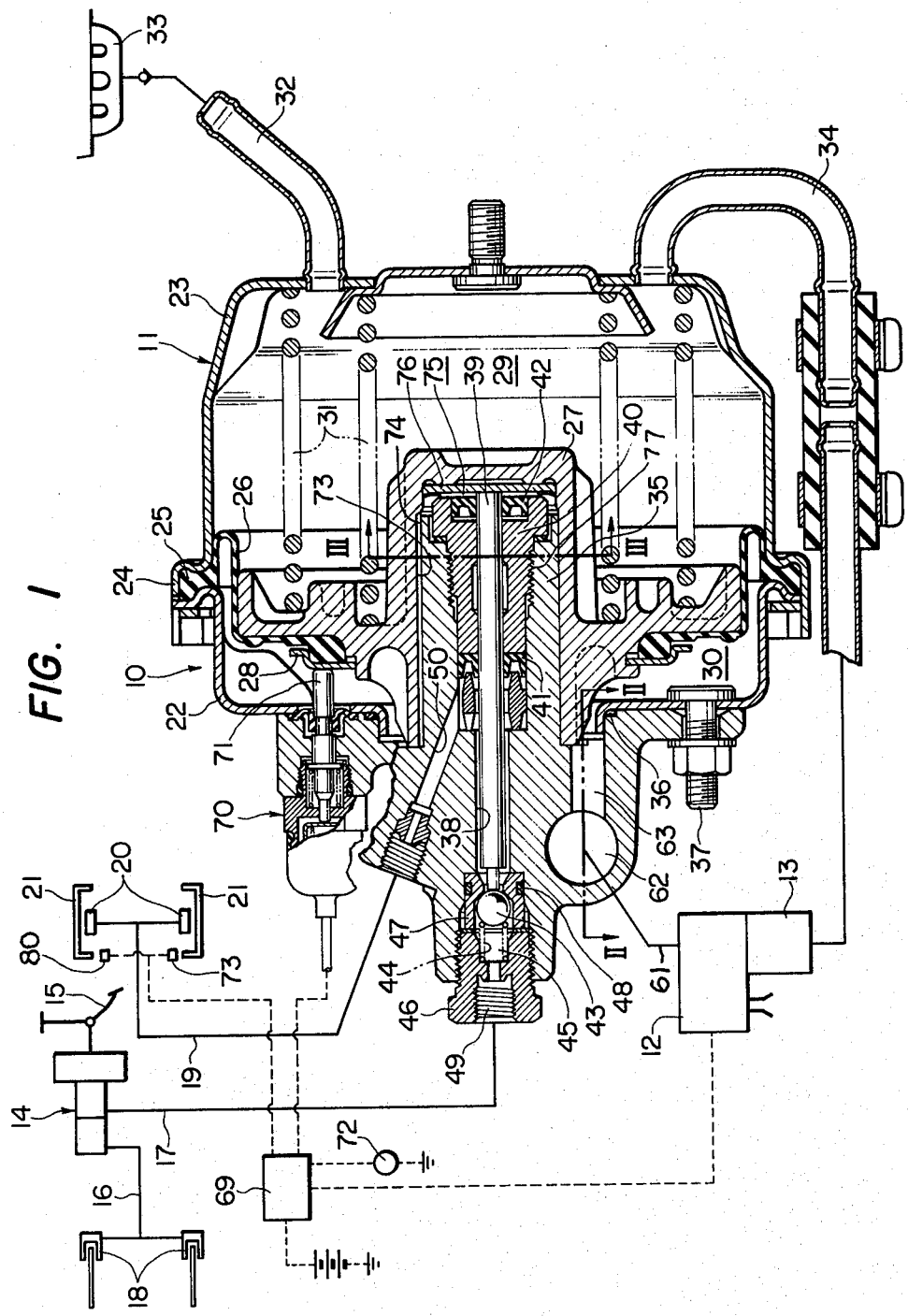
FIG. 1 is a longitudinal cross-section through one embodiment of a brake pressure modulator of a control system of the invention, with related parts of the system being shown schematically.

With regard to FIG. 1 there is shown a servo-motor 10 having a motor housing 11, solenoid valve 12 and an inertia actuatable valve 13 (FIG. 2), that is, a G-sensor of a pure mechanical type. The servo-motor 10 is in fluid communication as described below with a master cylinder 14 that is mounted in a vehicle to be operable by a brake pedal 15. The master cylinder 14 provides braking pressures via conduits 16 and 17 to front wheel disc brake actuators 18 and to the servo-motor 10 which is connected by a conduit 19 to rear wheel cylinders 20 for the rear drum brakes 21, respectively. With particular regard now to the axial cross sectional view in FIG. 1, the housing 11 is more clearly depicted to involve a front shell 22 and a rear shell 23 joined, as by twist lock assembly 24 with a peripheral bead 25 of a rubber rolling diaphragm 26 interposed for sealing the puncture of the shells. The diaphragm 26 has at its central portion a movable wall or power piston 27 sealed thereto by means of an annular retainer member 28. The diaphragm and the wall cooperate to divide the housing interior into first and second chambers 29 and 30.

Figure 2:
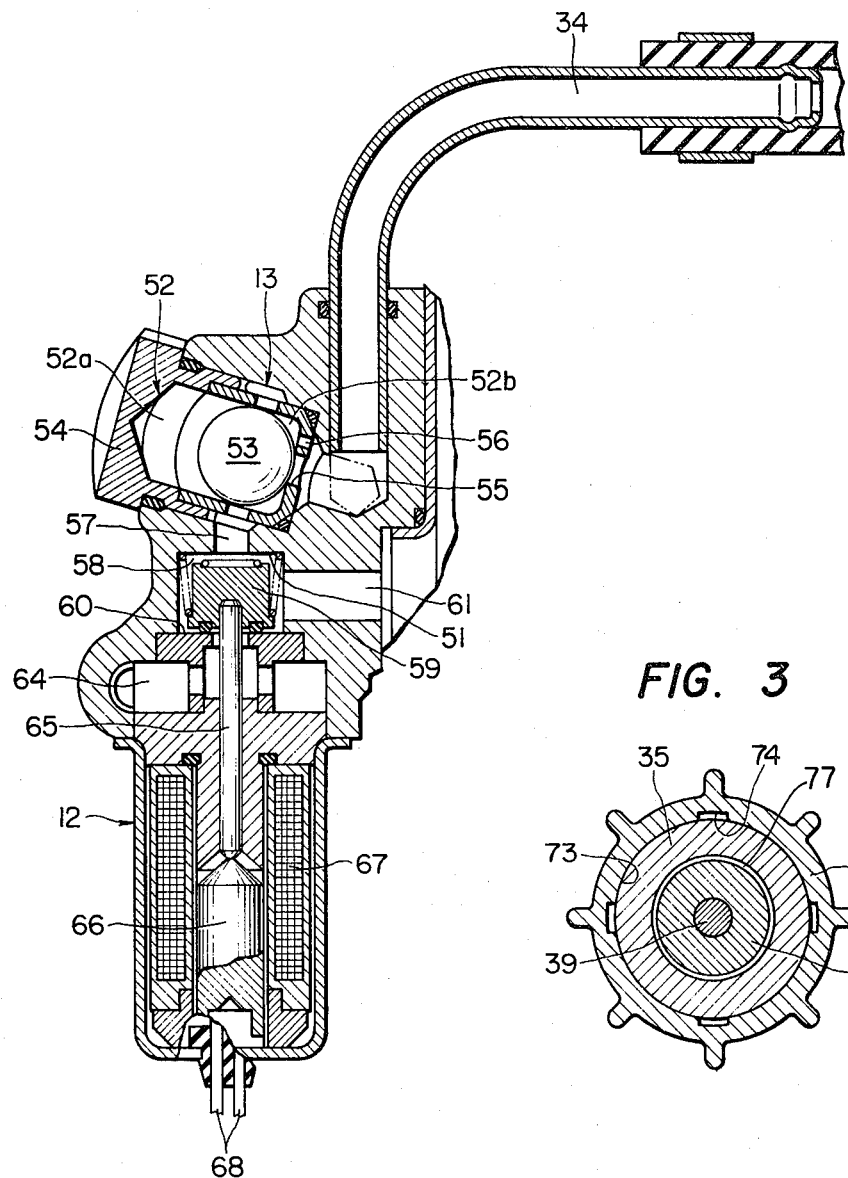
FIG. 2 is a partial view similar to FIG. 1 of the embodiment of FIG. 1 in cross section taken along the line II—II of FIG. 1.

A pair of compressed coiled springs 31 are installed in the rear shell 23 or chamber 29 so that it normally urges the wall member 27 to the left when installed. The chamber 29 is in communication through an inlet 32 with an engine intake manifold 23 and also in communication through a conduit 34 with the check valve 13 (FIG. 2). The shell 22 has in its inside face projected a hub assembly 35 sealingly secured to the outside of the shell 22 by sealing member 36 and bolts 37 (one of which is shown) thereby sealing against fluid flow between the outside and inside of the chamber 30.

On the hub assembly 35 is slidably supported the movable wall member 27. Axial support for the movable wall 27 is provided by the cylindrically projecting hub assembly 35 that extends into the chamber 30. The hub assembly 35 includes a bore 38 for the receipt of a plunger 39 which is in slidable and sealing engagement with a plug 40 via cup seal members 41 and 42 which prevent hydraulic fluid flow out of the bore 38 into the chamber 30. The plug 40 is threaded as at 77 to be screwed into a tapped bore of the body of the hub assembly 35. The rod or plunger 39 is normally at its left end in abutting relation with a ball 43 via a compressed coil spring 44 in a chamber 45 with its left end anchored to a plug 46 and right end anchored to the ball 43. The plug 46 is threaded to be screwed into a tapped bore of the body of the hub assembly 35 for retaining a seat member 47 between the plug 46 and the bottom end of the bore or chamber 45 in sealed relation with the bore 45 by seal member 48 to prevent fluid flow along the periphery of the seat member 47.

The chamber 45 is connected through a port 49 and conduit 17 to the master cylinder 14. The bore 38 is in communication through a passage 50 and conduit 19 with the wheel cylinders 20 of the rear brakes 21.

The check valve member 13 (FIG. 2) has a bore 52 for retaining a ball valve 53 therein in cooperation with a plug 54 which is screwed into a tapped portion of the bore 52. The bore or chamber 52 is in communication through a seat member 55 as well as an orifice 56 with the conduit 34. The chamber 52 is further in communication through a passage 57 with a chamber 58 of the solenoid valve 12. The diameter of the ball 53 is such that it has substantial freedom of movement in the chamber 52 yet provides a compartment separation wall which has a suitable amount fluid flow permitted along the ball 53.

The chamber 58 contains a double acting valve member 59 which is normally spring biased toward engagement with a lower seat 60. The chamber 58 is in communication through passages 61, 62 and 63 (FIG. 1) with the chamber 30 of the housing 11. The chamber 58 is further in communication through the seat 60 and cavity 64 with atmosphere.

From the foregoing description, it will be apparent that the movable wall 27 reciprocates within the housing 11 in sliding engagement with the hub assembly 35 as a result of pressure differential being applied to opposite sides of movable wall 27 as will be described in greater detail hereinbelow.

The double acting valve member 59 is in contact engagement through a rod 65 with a plunger 66 of electromagnetically operable character in a magnetic field developed by an electric coil 67 which is connected by wires 68 with a computer 69 as shown in dotted lines in FIG. 1.

The failure sensing switch 70 is provided as shown in FIG. 1 at the outside face of the shell 22. The switch 70 has a plunger 71 in contact engagement with the power piston 27 in the housing 11 so that any failure or unusual operation of the piston or wall member 27 is sensed through the plunger 71 and its associated parts for displaying by the warning lamp 72 or the like. The numeral 80 indicates a skid sensor connected to the computer 69 as shown in dotted lines.

Figure 3:
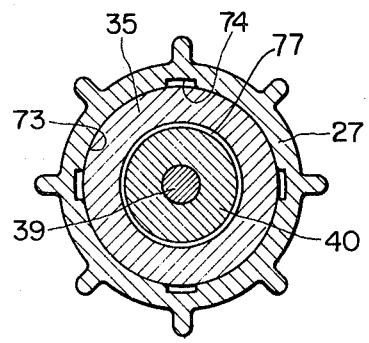
FIG. 3 is a cross sectional view taken along the line III—III of FIG. 1.

With particular regard to FIG. 3, the power piston wall member 27 has a blind bore 73 which is slidingly fit on the hub assembly 35. The plug 40 is in screw threaded engagement with the hub assembly 35 while being in sliding and sealing engagement with the plunger 39. As best shown in FIG. 3, the piston wall 27 is provided with a suitable number of axial grooves 74 in the internal face of the bore 73, the grooves 74 extend throughout the full length of the bore so that a cavity 75 defined between the right end face of the plug 40 and bottom of the bores 73 is normally in fluid communication with the chamber 30 of the housing. In the cavity 75 is captive a circular plate 76 to provide a retracted position for the plunger 39 with the right end thereof in abutment thereto.

The grooves 74 provide a mechanism for normally ensuring fluid communication of the cavity 75 with the chamber 30 in the housing 11, so that the reciprocation of the piston wall 27 in operation is freed from any tendency of resistance as would otherwise be presented by a vacuum or compressed air pressure in the cavity 75.

The grooves 74 further provide for a better storage for lubricant grease, when installed.

The general object of the invention is directed to the provision of the grooves 74. In order to understand completely the invention, the following description of operation of the anti-skid brake control system is considered necessary.

In operation, the wall 27 and all other parts are retained in the positions shown in FIG. 1 of the drawings in the normally retracted position of these servo-motor. In the positions, fluid pressure developed in the master cylinder 14 is transmitted through conduit 16 directly to front wheel disc brake actuators 18 and also to the rear wheel cylinders 20 through conduit 17, port 49, chamber 45, seat 47 in opened postion, chamber 38, passage 50 and conduit 19. In these condition, the chambers 29 and 30 in the housing 11 are in fluid communication with each other through conduit 34, orifice 56 (FIG. 2), chamber 52b, passage 57, seat 51, chamber 58, and passages 61 to 63 (FIG. 1).

Whenever the braking pressure developed in the rear brake wheel cylinders 20 begins to approach a value that will lock the rear wheel brakes 21, the sensor 73 will call upon the computer system 69 to provide a signal to the solenoid valve 12 to energize and push the double acting valve 59 into seat 51 and unseat it from seat 60. This terminates the communication between the chambers 29 and 30. Air is accordingly admitted into chamber 30 through passage 64 which is in communication with the atmosphere, seat 60, chamber 58, and passages 61 to 63. Air entering the chamber 30 through the solenoid valve 12 creates a biasing pressure differential across the diaphragm piston 27 to the right against its biasing spring 31, to effect a new equilibrium position piston 27. A displacement rod or plunger 39 is normally urged by fluid pressure in the chamber 38 to the right and extends through seat 47 to abut ball valve 43. With diaphragm 26 all the way to the right corresponding to on signal repetition rate, valve ball 43 is seated on the seat 47 interrupting communication of hydraulic brake fluid from the master cylinder 14 through valve seat 47, chamber 38 passage 50 and conduit 19 to the wheel cylinders 20.

As the pulse or signal repetition rate increases, diaphragm 26 moves to the right of a new equilibrium position, thereby moving the rod 39 to the right and allowing spring 44 to force ball 43 against seat 47, thereby isolating the master cylinder 14 from the wheel cylinder 20 and trapping a fluid pressure in the wheel cylinders 20. As the pulse repetition rate increases still further, diaphragm 26 moves further to the right, carrying the rod 39 to the right. Chamber 38 whose right edge is defined by gasket or seal 41 increases in volume causing the hydraulic fluid pressure trapped in the wheel cylinders 20 to be attenuated. At maximum pulse repetition rate, diaphragm 26 has moved as far to the right as possible and the volume of chamber 38 has increased to the point where the fluid pressure in the wheel cylinders 20 has been completely relieved and the brake released. Of course, as the pulse repetition rate now decreases, the diaphragm returns to the left first forcing the hydraulic fluid back into the wheel cylinders 20 and finally when the pulse repetition rate has decreased sufficiently, lifting ball 43 from seat 47 once again permitting free communication from the master cylinder 14 to the wheel cylinders 20. It can thus be seen that brake pressure is released proportional to wheel deceleration, in a critical band of wheel deceleration.

With the check valve 13, the weight of the ball valve 53 (FIG. 2) is so calculated in design that it is held in the position shown when the resultant vehicle deceleration does not reach a first predetermined lower threshold value. In this position fluid flow across the valve 13 is restricted to the smaller capacity of the orifice 56. Should the deceleration increase over the predetermined value, an inertial force developed in the ball will force ball 53 from seat 55 and allow additional flow of air through seat 55. It will be noted that in an opened position of the ball 53, a violent flow of air is permitted through the check valve 13 so that residual pressure in chamber 30 can be trapped rapidly and in a closed position of the ball 53, a gradual fluid flow results through the orifice 56 and hence a gradual trapping of the pressure in chamber 30 is allowed.

From the foregoing it will be noted that the rapid trapping of the pressure in chamber 30 will result in a rapid reapplication of pressure in wheel cylinders 20 while slow trapping of the pressure in chamber 30 will result in a slow repressurization in wheel cylinders 20. The rapid reapplication of the pressure in wheel cylinders 20 is beneficially suited to anti-skid brake control in the case where the vehicle travel on a higher coefficient road surface, while the gradual or slow reapplication of the pressure in wheel cylinders 20 is beneficially suited to anti-skid brake control in the case where a lower coefficient road surface exists.

Upon release of the vehicle rear wheel brakes 21, the computer is deactivated and the solenoid valve 12 is de-energized to disengage valve 59 from seat 51 and engage the opposite seat 60 so that residual atmospheric pressure in chamber 30 is trapped through passages 63, 62 and 61, chamber 58 passage 57, chamber 52, and conduit 34 into chamber 29 and thence, in the sequel, to the vacuum source 33.

Obviously, numerous modifications and variations of the present invention are possible in light of the above teachings. It is therefore to be understood that within the scope of the appended claims, the invention may be practiced otherwise than as specifically described herein.

What we claim is:

1. A brake control system for a motor vehicle having a master cylinder and brake actuators comprising:
    a brake modulator for modulating, in response to a sensed vehicle skid condition, braking effort being applied from said master cylinder to said brake actuators, wherein said brake modulator further comprises;
    a housing operatively associated with said brake modulator;
    a power piston movable within said housing and forming a first chamber and a second chamber such that said power piston separates said first chamber from said second chamber;
    a pressure modulating plunger operatively associated with said power piston;
    fluid pressure cut-out valve means for blocking fluid pressure from said master cylinder in response to said sensed vehicle skid condition operatively associated with said pressure modulating plunger;
    means for controlling a pressure differential across said power piston which further comprises air passage means disposed between said first chamber and said second chamber; and
    a changeover valve for closing said air passage means and for admitting ambient air into said second chamber in response to said sensed vehicle skid condition and wherein said housing further comprises;
    guiding means operatively associated with said housing and projecting into said second chamber substantially coaxially with said power piston;
    said power piston having a blind force formed therein in sliding fitted engagement with said guiding means;
    at least one axial groove formed in the internal surface of said blind bore and extending throughout the full length of said blind bore for continuous communication of the interior of said blind bore with said second chamber through said at least one axial groove; and
    lubricant stored within said at least one axial groove.

2. A brake control system according to claim 1, wherein the fluid pressure cut-out valve means is operatively connected with the pressure modulating plunger through means of the pressure modulating plunger so that the fluid pressure cut-out valve means is in advance closed before the modulation of the pressure.

3. A brake control system according to claim 1, wherein the changeover valve is an electro-magnetically operable solenoid valve sensitive to an electric input for closing the air passage and admitting ambient air to the said one of the chambers.

4. A brake control system according to claim 1, wherein the housing is formed of two shells joined together and the power piston is formed of a rolling diaphragm and a wall member incorporating the blind bore therein, said diaphragm having a peripheral bead interposed for sealing the puncture of the shells between the shells by means of a twist lock assembly and a central portion sealed to the wall member.

5. A brake control system according to claim 1, wherein the guide means is in a cylindrical form to have an axial chamber for the receipt of the pressure modulating plunger therewithin, the axial chamber being sealingly closed by means of a plug member and in communication with the shell brake actuators as well as the brake master cylinder through the pressure cut-out valve means, the pressure modulating plunger extending slidingly and sealingly through the plug member.

6. A brake control system according to claim 5, wherein the pressure cut-out valve means is formed of a ball valve and a seat, the plunger extending through the seat for abutment engagement with the ball valve at one end thereof opposite to that being in abutment engagement with the wall member, said ball valve being spring urged toward abutment engagement with the plunger.

7. A brake control system according to claim 5, wherein the plug member sustains at least one cup seal member for preventing hydraulic fluid flow out of the axial chamber into the housing along the surface of the pressure modulating plunger and between the internal surface of the axial chamber and the plug.

8. A brake control system according to claim 1, wherein the brake modulator further comprises a flow control valve member in the air passage for partially blocking the air passage between the changeover valve and the said one chamber in proportion to the vehicle deceleration.

* * * * *

UNITED STATES PATENT AND TRADEMARK OFFICE
CERTIFICATE OF CORRECTION

PATENT NO. : 4,432,586
DATED : February 21, 1984
INVENTOR(S) : Masamoto Andoh et al It is certified that error appears in the above-identified patent and that said Letters Patent is hereby corrected as shown below:

On the title page, Item [73] Assignee: should read

--[73] Aisin Seiki Kabushiki Kaisha, and Toyota Jidosha Kogyo Kabushiki Kaisha, Aichi-Ken, Japan --.

Signed and Sealed this

Fifth Day of March 1985

[SEAL]

Attest:

DONALD J. QUIGG

Attesting Officer     Acting Commissioner of Patents and Trademarks